United States Patent [19]
Orzal

[11] Patent Number: 5,984,425
[45] Date of Patent: Nov. 16, 1999

[54] SPRING APPLIED/HYDRAULICALLY RELEASED BRAKING SYSTEM EMPLOYING SELF-RESETTING OVERRIDE VALVE

[75] Inventor: Gregory J. Orzal, Hardford, Wis.

[73] Assignee: Wacker Corporation, Menomonee Falls, Wis.

[21] Appl. No.: 09/012,134

[22] Filed: Jan. 22, 1998

[51] Int. Cl.⁶ .................................................. B60T 13/74
[52] U.S. Cl. ........................... 303/3; 303/71; 303/76; 188/170
[58] Field of Search .................. 188/170; 303/3, 303/11, 15, 9.76, 76, 71, 2, 119.1, 119.2

[56] References Cited

U.S. PATENT DOCUMENTS

| | | | |
|---|---|---|---|
| 3,985,210 | 10/1976 | Hodge et al. | 188/170 |
| 4,063,491 | 12/1977 | Roger et al. | 92/130 |
| 4,158,470 | 6/1979 | Koenig | 303/71 |
| 4,195,716 | 4/1980 | Wirt | 192/3 R |
| 4,279,332 | 7/1981 | Morgan et al. | 188/170 |
| 4,313,643 | 2/1982 | Exley | 303/71 |
| 4,361,078 | 11/1982 | Cape et al. | 92/31 |
| 4,552,056 | 11/1985 | McKay | 92/29 |
| 4,616,882 | 10/1986 | Bueno | 303/68 |
| 4,747,760 | 5/1988 | Eberl et al. | 417/443 |
| 4,813,518 | 3/1989 | Akiyama et al. | 188/170 |
| 4,856,622 | 8/1989 | Sartain et al. | 188/170 |
| 4,874,065 | 10/1989 | Engle | 188/265 |
| 5,050,939 | 9/1991 | Middelhoven et al. | 303/71 |
| 5,417,479 | 5/1995 | Wallestad et al. | 303/7 |

*Primary Examiner*—Robert J. Oberleitner
*Assistant Examiner*—Robert A. Siconolfi
*Attorney, Agent, or Firm*—Nilles & Nilles, S.C.

[57] ABSTRACT

A spring applied, hydraulically released (SAHR) parking and emergency brake system 1) can be manually overridden to permit towing or assisted vehicle transport when charge pump pressure is unavailable for the brakes, and 2) is reset either a) automatically when charge pump pressure becomes available or b) manually. Override is made possible by a manual override assembly that includes a manually-actuated hand pump and an override valve. The override valve is manually actuated to isolate the brake release actuators and the outlet of the hand pump from the system's reservoir and is reset to its open position in response to the presence of hydraulic pressure at a designated location of the braking system. Automatic reset of the override valve preferably is effected by the supply of pressurized fluid to a previously-unpressurized port of the override valve. The hand pump, override valve, and any other brake control valve(s) of the braking system preferably are incorporated into a single control module.

25 Claims, 3 Drawing Sheets

SPRING APPLIED/HYDRAULICALLY RELEASED BRAKING SYSTEM EMPLOYING SELF-RESETTING OVERRIDE VALVE

BACKGROUND OF THE INVENTION

1. Field of the Invention

The invention relates to braking systems and, more particularly, relates to a spring applied, hydraulically released parking and emergency brake system which is usable with a vehicle such as a ride-on roller and which includes a manually actuated, self-resetting override valve that permits manual release of the brakes for the purposes of vehicle towing or the like. The invention additionally relates to a vehicle employing such a braking system and to a method of operating such a braking system.

2. Discussion of the Related Art

Many vehicles, and particularly many off-road vehicles, employ spring applied, hydraulically released (SAHR) parking and emergency braking systems. In these systems, a brake such as shoe assembly or a disk assembly is engaged under the force of a spring which permanently biases the brake towards its applied or engaged position. The brake is released by hydraulic pressure generated by a charge pump driven directly or indirectly by the vehicle's engine. In vehicles which either employ separate service and emergency braking systems or which lack a service braking system altogether, the emergency brake is released whenever the engine is operating and the charge pump is capable of generating hydraulic fluid pressure.

SAHR parking and emergency braking systems often include brake override assemblies to permit manual brake override for vehicle towing or assisted transport when the engine is not running, the charge pump fails, or when the vehicle otherwise is incapable transmitting hydraulic pressure to the brakes. One such brake override assembly is disclosed in U.S. Pat. No. 4,195,716 to Wirt (the Wirt patent). The brake override assembly of the SAHR braking system disclosed in the Wirt patent includes a manual cut-off valve and a manual hydraulic pump. The cut-off valve is located in a conduit leading from the system's brake control mechanism to the brake release actuators. The pump is disposed in an auxiliary conduit fluidically coupled to the brake release actuators. To release the brakes for towing or assisted transport, the cut-off valve is closed, and the pump is actuated to pressurize the brake release actuators and, hence, to release the brakes.

In braking systems such as the one disclosed in the Wirt patent, the brake release actuator of each brake assembly remains separated from the vehicle's tank or reservoir for so long as the manual override valve is in its actuated or closed position. As a result, the brakes remain disengaged unless and until the override valve is manually reset to its normal operating position in which fluid may flow from the brake release actuators to the vehicle's reservoir or tank. If the operator fails to reset the override valve to its normal operating position upon vehicle restart, the brakes cannot be reapplied. Hence, the safety of the operator and/or bystanders could be compromised by inadvertent operation of the vehicle with the parking and emergency brakes in an override condition.

OBJECTS AND SUMMARY OF THE INVENTION

It is therefore a principal object of the invention to provide a spring applied, hydraulically released parking and emergency braking system that incorporates a manually-actuated brake release subsystem which permits manual brake release for towing or assisted transport but which is reset automatically upon vehicle restart.

Another object of the invention is to provide a braking system that meets the first principal object of the invention and that is simple and reliable in construction and operation.

In accordance with a first aspect of the invention, this object is achieved by providing a spring applied, hydraulically released parking and emergency braking system that includes a brake assembly and a hydraulic release subsystem. The brake assembly includes a brake which is movable between an applied position and a released position, a spring which biases the brake towards the applied position, and a brake release actuator which is selectively operable to release the brake against an application force imposed by the spring. The hydraulic release subsystem includes a source of pressurized hydraulic fluid, a reservoir, a control device which is switchable from a first configuration coupling the brake release actuator to the source of pressurized hydraulic fluid to a second configuration coupling the brake release actuator to the reservoir, and a manual override assembly. The manual override assembly includes 1) a pump which has an outlet in fluid communication with the brake release actuator, and 2) a manually actuated, automatically resettable override valve which is manually closable to isolate the brake release actuator and the outlet of the pump from the reservoir and which opens automatically in response to the presence of hydraulic pressure at a designated location in the braking system to permit fluid flow therethrough.

The override valve preferably comprises a two-way/two-position valve which includes 1) a manual actuator which, when actuated, closes the override valve, and 2) a pilot actuator which is in fluid communication with the designated location of the braking system and which automatically opens the override valve in response to the presence of hydraulic pressure at the designated location of the braking system. The override valve preferably is located in a hydraulic conduit connecting the control device to the brake release actuator.

The override valve preferably comprises a housing and a spool. The housing includes 1) an axial bore, 2) a first port in fluid communication with the control device, and 3) a second port in fluid communication with the brake release actuator. The spool is movable in the axial bore from a first position permitting fluid flow between the first port and the second port and a second position prohibiting fluid flow between the first port and the second port.

Another object of the invention is to provide a braking system that meets the first principal object of the invention and the principal components of which are of modular design.

In accordance with another aspect of the invention, this object is achieved by integrating the manual override assembly and the control device into a single brake control module. The control module has a first port in fluid communication with the source of pressurized hydraulic fluid, a second port in fluid communication with the brake release actuator, and a third port in fluid communication with the reservoir.

Another principal object of the invention is to provide a vehicle incorporating an improved parking and emergency braking system that meets the first principal object of the invention.

In accordance with another aspect of the invention, this object is achieved by providing a vehicle which incorporates a braking system constructed in accordance with the first aspect of the invention. The vehicle may, for instance, comprise a ride-on roller, in which case the braked elements may comprise metal drums.

Still another principal object of the invention is to provide an improved method of braking a vehicle in a parking or emergency situation so as to permit manual override of the brakes for towing or assisted transport while also automatically resetting the brakes to their normal operative mode upon vehicle restart.

In accordance with yet another aspect of the invention, this object is achieved by applying a brake by bleeding pressurized hydraulic fluid from a brake release actuator to permit a spring to actuate the brake release actuator, and then manually releasing the brake. The brake is manually released by 1) manually actuating an override valve to isolate an outlet of a pump and the brake release actuator from a reservoir, and 2) manually actuating the pump to supply pressurized hydraulic fluid to the brake release actuator to thereby release the brake against an application force imposed by the spring. Upon vehicle restart, the brake is automatically reset by automatically resetting the override valve upon generation of hydraulic pressure by the braking system to thereby permit subsequent return fluid flow through the override valve from the brake release actuator.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Pursuant to the invention, a spring applied, hydraulically released (SAHR) parking and emergency brake system 1) can be manually overridden to permit towing or assisted vehicle transport when charge pump pressure is unavailable for the brakes, and 2) is reset either a) automatically when charge pump pressure becomes available or b) manually. Override is made possible by a manual override assembly that includes a manually-actuated hand pump and an override valve. The override valve is manually actuated to isolate the brake release actuators and the outlet of the hand pump from the system's reservoir and is automatically reset to its open position in response to the presence of hydraulic pressure at a designated location of the braking system. Automatic reset of the override valve preferably is effected by the supply of pressurized fluid to a previously-unpressurized port of the override valve. The hand pump, override valve, and any other brake control valve(s) of the braking system preferably are incorporated into a single control module.

Figure 1:
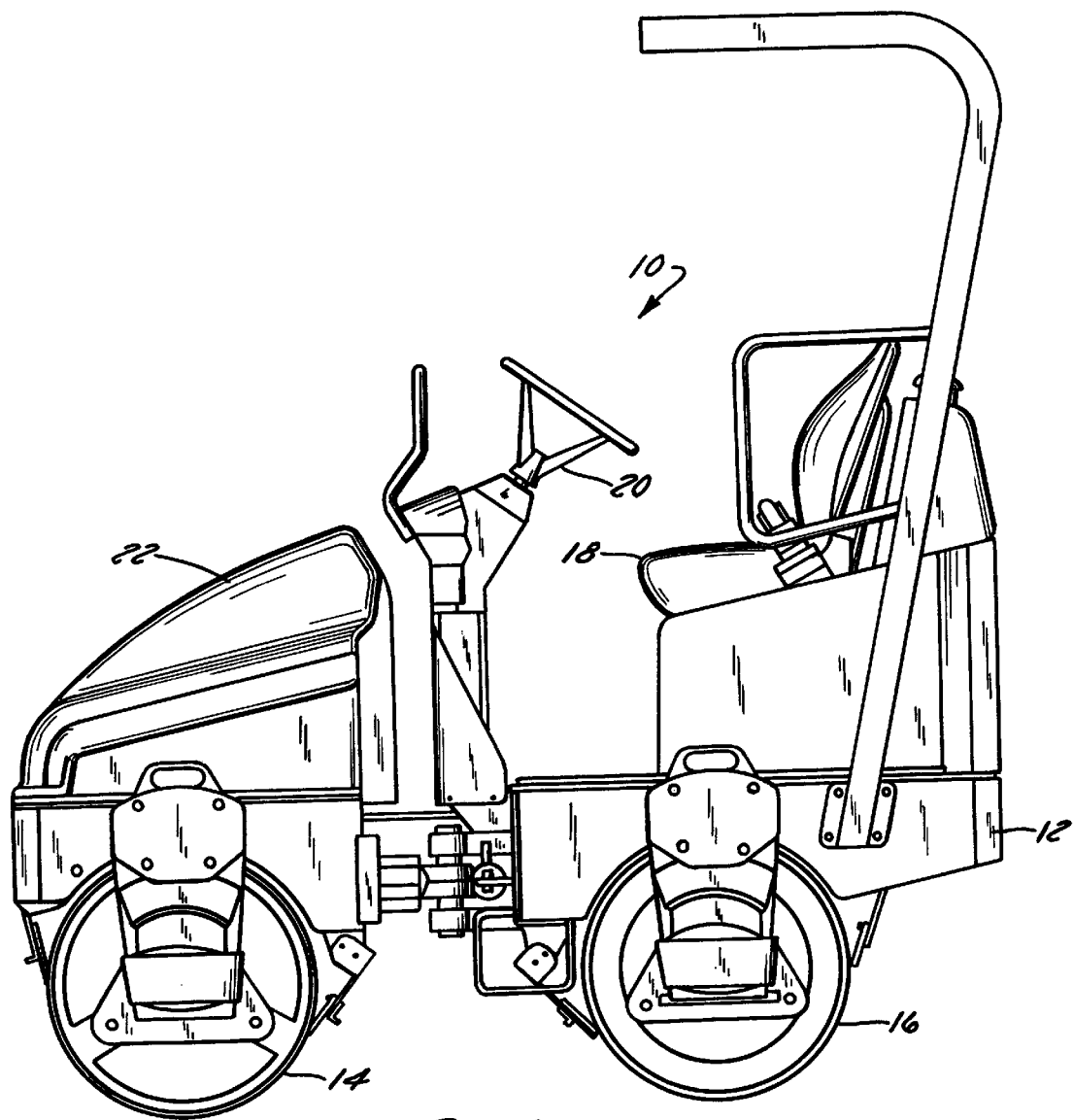
FIG. 1 is a side elevation view of a ride-on roller having a spring applied, hydraulically released (SAHR) parking and emergency braking system constructed in accordance with a preferred embodiment of the present invention.

The inventive spring applied, hydraulically released (SAHR) parking and emergency braking system is designed for braking a ground-engaging rotatable member of a self-propelled vehicle. The rotatable member may comprise either a wheel or a roller. The vehicle may, for instance, comprise a ride-on roller 10 illustrated in FIG. 1. The roller 10 includes a chassis 12 that is supported on wheels which comprise metal drums 14 and 16. More traditional hard rubber or inflatable wheels could be used in place of the drums 14 and 16 in other applications. Each of the drums 14 or 16 is driven by a separate drive train (not shown). Supported on the chassis 12 are an operator's seat 18 and suitable controls including a steering wheel 20. The engine and major controls of the braking system, including a charge pump and control module, (all detailed below) are protected by a suitable hood 22. At least one, and preferably both of the drums 14, 16 are fitted with a separate brake (FIG. 2).

Figure 2:
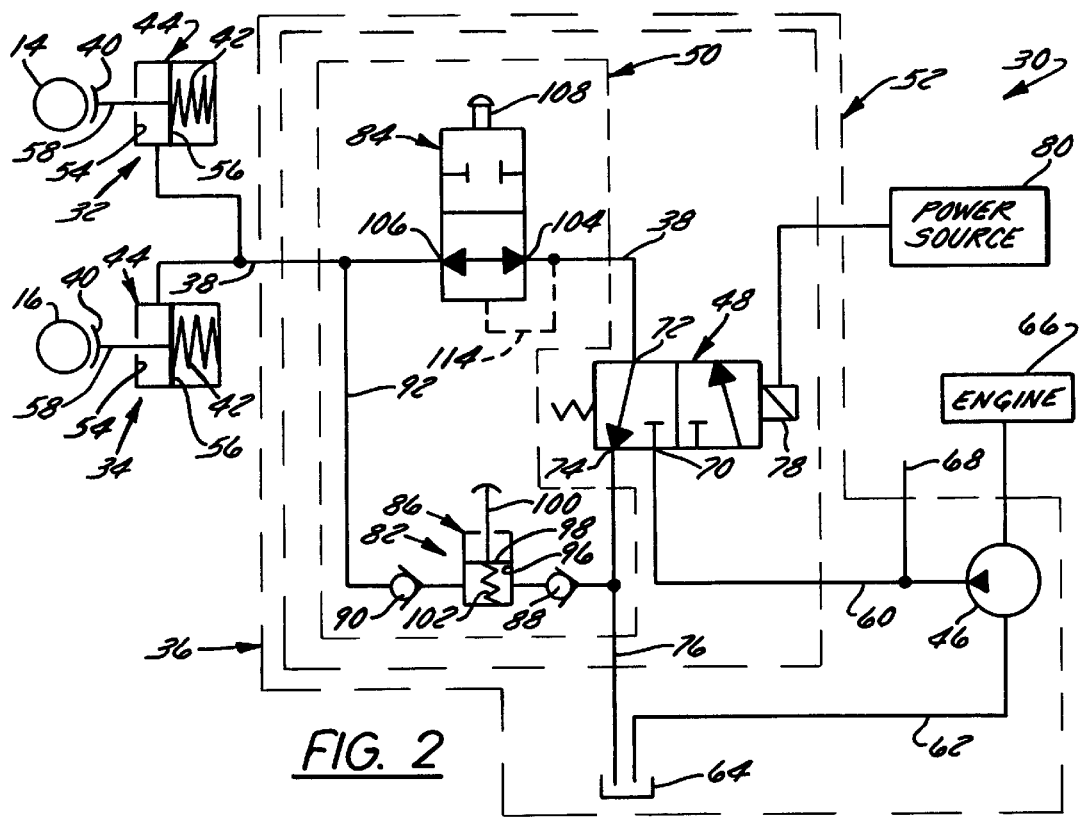
FIG. 2 is a hydraulic circuit diagram of the braking system of the vehicle of FIG. 1.

Referring now to FIG. 2, a SAHR parking and emergency braking system 30 for the ride-on roller 10 includes a pair of brake assemblies 32, 34 and a hydraulic release subsystem 36 coupled to both brake assemblies 32, 34 by a common brake actuator supply conduit 38. Each brake assembly 32 or 34 includes a brake 40, a spring 42 which biases the brake 40 towards an applied position, and a brake release actuator 44. The hydraulic release subsystem 36 includes a source 46 of pressurized hydraulic fluid, a control device 48 for controlling fluid flow to and from the brake release actuators 44 during normal vehicle operation, and a manual override assembly 50 for permitting manual override of the brakes 40 for the purposes of towing or assisted vehicle transport. The control device 48 and manual override assembly 50 preferably are incorporated into a single control module 52 best seen in FIG. 5.

The brake assemblies 32, 34 are each of the type used in a standard SAHR braking systems. The brake 40 of each brake assembly 32 or 34 may comprise any conventional disk-type or shoe-type brake that is engaged by the associated spring 42 and that is disengaged by hydraulic fluid flow into the associated brake release actuator 44. Each brake release actuator 44 includes a chamber 54 and a piston 56 which is slidably mounted in the chamber 54 and which is coupled to the brake 40 by a linkage 58. The spring 42 is mounted in one end of the chamber 54 so as to bias the piston 56 towards a brake-applied position. The spring 42 is sufficiently strong to apply brakes 40 in the absence of pressurized hydraulic fluid in the chamber 54. A sealed portion of the chamber 54, disposed opposite the spring 42, is coupled to the brake release actuator supply conduit 38 so as to selectively admit pressurized hydraulic fluid into the chamber 54 to release the brake 40 against the force of the spring 42.

The source 46 is coupled to the control module 52 by a main supply conduit 60 and receives hydraulic fluid from a tank or reservoir 64 via a feed conduit 62. The source 46 preferably comprises a mechanically, electrically, or hydraulically operated charge pump that is operated either directly or indirectly by the vehicle's engine 66 and, therefore will henceforth be referred to as a "charge pump." The charge pump 46 also generates hydraulic fluid for other hydraulically-operated components of the vehicle 10 and supplies the pressurized fluid to these components from a conduit 68 branching off from the main supply conduit 60.

Still referring to FIG. 2, the purpose of the control device 48 is to permit at least selective brake application and release when the engine 66 and charge pump 46 are operating. While the control device 48 could comprise two or more valves operating in concert, it preferably comprises a single valve and, accordingly, will henceforth be referred to as a "control valve." The control valve 48 is a three-way/two-position valve that includes 1) a first port 70 in fluid communication with the main supply conduit 60 and the charge pump 46, 2) a second port 72 in selective fluid communication with the brake release actuator supply conduit 38, and 3) a third port 74 in fluid communication with the reservoir 64 via a drain conduit 76. The control valve 48 conceivably could be pilot-actuated by a pilot conduit connected to the main supply conduit 60 or to some other pressurizable portion of the vehicle's hydraulic system. In the illustrated and preferred embodiment, however, the control valve 48 is solenoid-actuated. Control valve 48 therefore includes a solenoid actuator 78 that is connected to an electrical power source 80. The power source 80 could be as sophisticated as an electronic control unit (ECU) or as simple as a battery. Signals are transmitted from the power source 80 to the solenoid actuator 78 upon closure of a suitable brake-release switch such as a key switch or a seat switch.

In the absence of an electrical signal from the power source 80, the control valve 48 assumes the position illustrated in FIG. 2 in which it connects the second port 72 to the third port 74 to connect the brake release actuator supply conduit 38 to the reservoir 64. Actuation of the solenoid actuator 78 under power of an electronic signal from the power source 80 causes the control valve 48 to switch over to the non-illustrated position in which the second port 72 is connected to the first port 70 to permit the supply of pressurized hydraulic fluid to the brake release actuator supply conduit 38 from the charge pump 46 and the main supply conduit 60. In the usual case in which the SAHR parking and emergency brake system 30 is designed to apply the brakes 40 only when the vehicle's engine 66 is not running, the solenoid actuator 78 will be energized whenever the engine 66 and charge pump 46 are operating. It is conceivable, however, that the braking system 30 could also be used as a service braking system to selectively brake the vehicle 10 when the vehicle is operating. Service braking could entail the closure of a manually-operated switch (such as a brake pedal-operated switch) to cease signal delivery to the valve solenoid actuator 78 with resultant control valve switchover and brake engagement.

As should be apparent from the above, brake release requires the supply of pressurized hydraulic fluid to the brake release actuators 44. This fluid pressure supply is not available if the charge pump 46 is unable to deliver pressurized hydraulic fluid to the brake release actuators 44 if, for instance, the engine 66 is not running, the charge pump 46 fails, or the main supply conduit 60 ruptures. The manual override assembly 50 permits brake release under these conditions to permit towing or assisted vehicle transport. Manual override assembly 50 includes a manually-actuated pump assembly 82 and an override valve 84. The pump assembly 82 permits manual generation of hydraulic fluid pressure and supply of the pressurized hydraulic fluid to the brake release actuators 44. The override valve 84 selectively isolates the brake release actuators 44 and the pump assembly 82 from the reservoir 64.

The pump assembly 82 may comprise any manually-operated device capable of generating hydraulic fluid pressure of sufficient magnitudes to release the brakes 40. The illustrated pump assembly 82 includes a manually-actuated hand pump 86 and first and second check valves 88 and 90, all of which are located in an auxiliary conduit 92 leading from the drain conduit 76 to the brake release actuator supply conduit 38. The hand pump 86 includes a chamber 96 and a piston 98 sealingly and slidably disposed in the chamber 96. Piston reciprocation is effected via a plunger 100 which is reciprocal with respect to the chamber 96 from an extended, primed position illustrated in FIG. 2 to an inserted, pressure-generating position. A return spring 102 is disposed within the chamber 96 beneath the piston 98 for biasing the plunger 100 towards its extended position.

The override valve 84 may comprise any structure 1) which is manually actuated to isolate the brake release actuators 44 from the reservoir 64 and 2) which opens automatically in response to the presence of hydraulic pressure at a designated location in the braking system 30 so as to permit brake reapplication when charge pump pressure is available. In the illustrated embodiment, the override valve 84 comprises a two-way/two-position valve disposed in the brake release actuator supply conduit 38 at a location upstream of the auxiliary conduit 92. The override valve 84 is switchable between an open position (FIGS. 2 and 3) permitting unrestricted fluid flow between ports 104 and 106 thereof to a closed position (FIG. 4) prohibiting fluid flow therethrough and hence isolating the pump outlet and the brake release actuators 44 from the override valve 84. Override valve closure is effected manually by a plunger 108. Valve reset or override valve opening is effected either manually or automatically whenever the engine 66 and the charge pump 46 are operating properly.

The override valve 84 could be reset by a variety of mechanisms. For instance, it is conceivable that the override valve 84 could include a solenoid actuator that is energized by the power source 80 whenever a suitable pressure sensor detects that the charge pump 46 is operating properly. In the illustrated and preferred embodiment, however, override valve reset is performed hydraulically via a pilot actuator 110 (FIGS. 3 and 4) that is in fluid communication with a designated location of the braking system 30 and which automatically resets the override valve 84 in response to the presence of hydraulic pressure at the designated location. Towards this end, the override valve 84 is connected to the designated location of the braking system 30 by a pilot conduit 114. In the illustrated and preferred embodiment, the pilot conduit 114 is formed integrally with the brake release actuator supply conduit 38 so that, in effect, the upstream end of the pilot conduit is connected to the brake release actuator supply conduit 38 at a location just upstream of the override valve 84. This pilot conduit configuration is preferred for at least two reasons. First, the desired automatic reset effect is achieved by this configuration due to the fact that the control valve 48 will be switched to its pressure supplying position whenever the vehicle engine 66 is operating (or at least upon engine start-up and thereafter for so long as the operator does not desire to release the brakes). Second, because the inlet port 104 of the valve 84 also serves as a pilot port, the need for a separate pilot conduit/pilot port subassembly is eliminated with resultant cost savings and reduction in likelihood of pilot conduit failure.

Figures 3, 4:
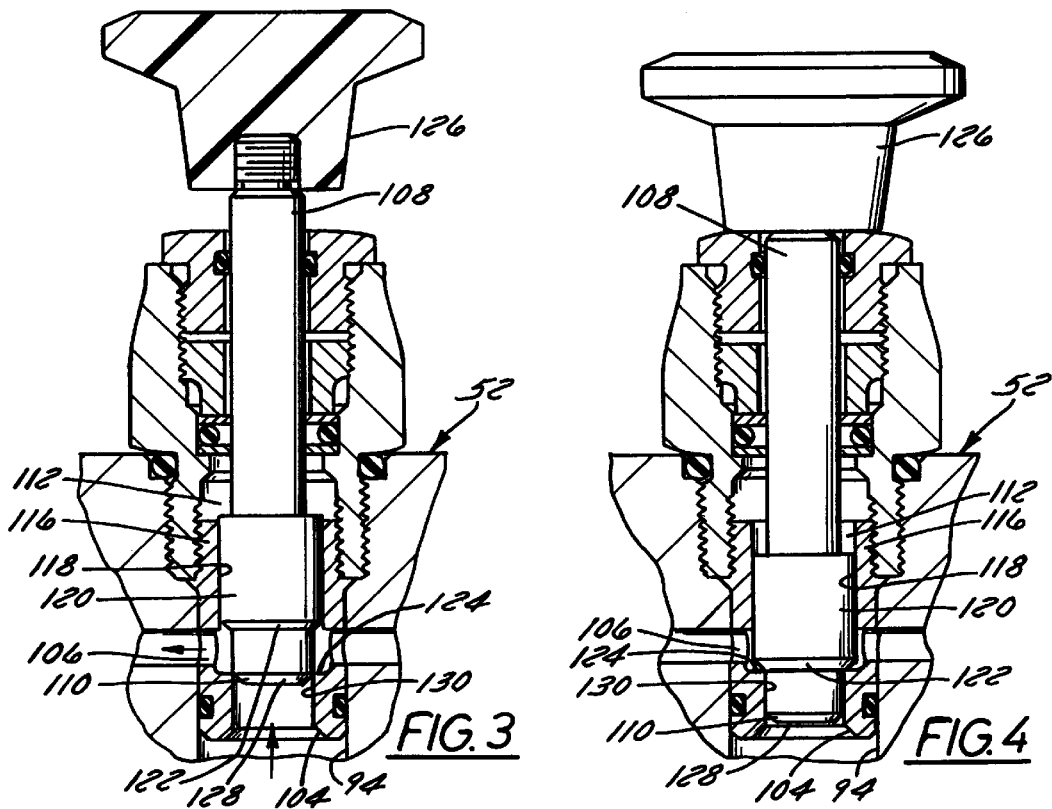
FIG. 3 is a sectional side elevation view of a manually actuated, pilot-pressure reset override valve usable in the braking system of FIG. 2 and illustrating the override valve in its open position.
FIG. 4 is a sectional side elevation view of the override valve of FIG. 3 and illustrating the override valve in its closed position.

The details of the override valve 84 are illustrated in FIGS. 3 and 4. The override valve 84 includes a valve housing 116 which is threaded into an internal bore 94 in the control module 52 and which includes an axial internal bore 118 for the passage of a spool 120 under power of either the plunger 108 or the pilot actuator 110. The spool 120 has a surface 122 which is spaced from a seat 124 when the override valve 84 is in the open position illustrated in FIG. 3 to permit fluid flow through the override valve 84 between the axial inlet/pilot port 104 and the radial outlet port 106. Override valve closure occurs when the spool 120 is driven downwardly as viewed in the drawings from the position illustrated in FIG. 3 to the position illustrated in FIG. 4 to isolate the port 104 from the port 106. A pressure balance across the spool 120 normally is maintained by permitting free fluid flow between the outlet port 106 and a cavity 112 receiving the opposite end of the spool 120. This pressure balance prevents the valve 84 from automatically resetting when pressure accumulates in the brake release actuators 44 upon operation of the hand pump 86.

Downward or closing movement of the spool 120 is effected manually by the plunger 108. Plunger 108 1) has a first end affixed to the spool 120, 2) extends upwardly through the bore 118, and 3) has a second end which extends out of the valve housing 116 and is threadedly attached to an actuating knob 126. If desired, the plunger 108 may incorporate a detent or some other structure that tends to hold the plunger 108 in its inserted position illustrated in FIG. 4 so as to prevent the override valve 84 from opening under vibrations or the like that may occur when operating the hand pump 86 or when towing the vehicle 10.

Upward or opening movement of the spool 120 is effected by the pilot actuator 110. The pilot actuator 110 extends downwardly through the bore 118 from the spool 120 so as to present a pressure-receiving surface 128 disposed in a pilot chamber 130 located between the inlet/pilot port 104 and the pressure-receiving surface 128. As should be apparent via a comparison of FIG. 4 to FIG. 3, admission of pressurized hydraulic fluid into the pilot chamber 130 from the inlet/pilot port 104 drives the spool 120 upwardly from the position illustrated in FIG. 4 to the position illustrated in FIG. 3 to permit fluid flow through the override valve 84 from the inlet/pilot port 104 to the outlet port 106.

Figure 5:
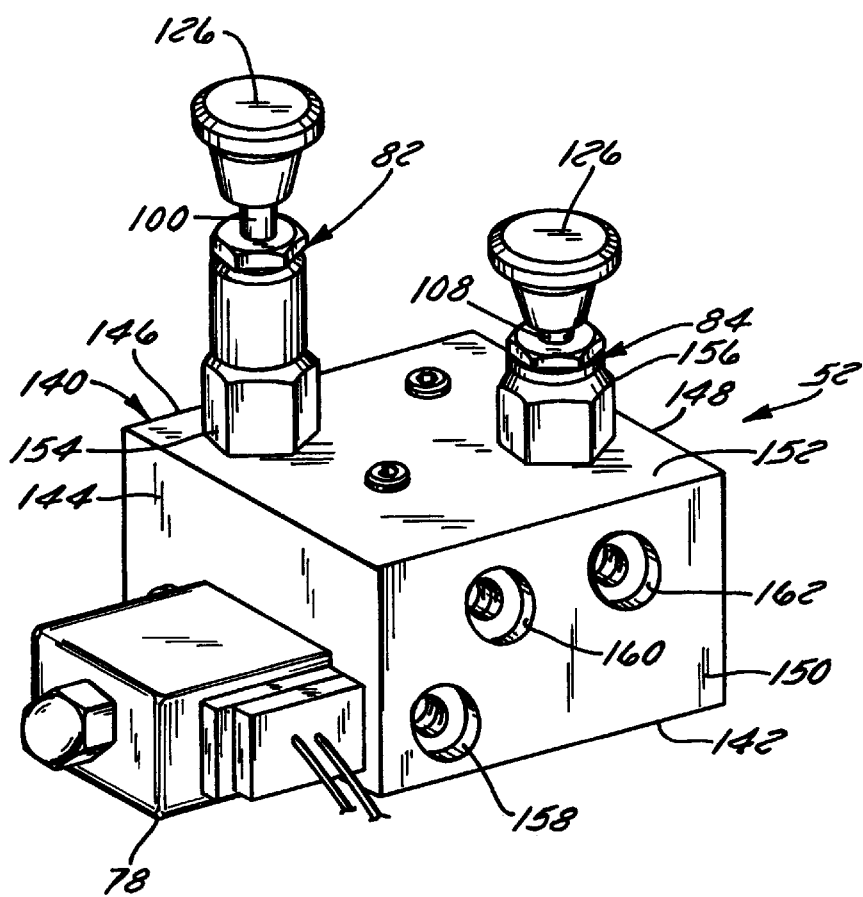
FIG. 5 is a perspective view of a control module incorporating valves and a manually-operated hand pump of the braking system of FIG. 2.

Referring now to FIG. 5, the control module 52 is configured to provide a compact braking system control assembly and to facilitate 1) assembly mounting on the vehicle 10, 2) assembly repair, and/or 3) assembly replacement. The control module 52 includes a generally-rectangular housing 140 having a base 142 for mounting on a suitable support surface of the vehicle 10, first through fourth side walls 144, 146, 148, 150, and an upper surface 152. The control valve 48, override valve 84, and hand pump 86 are all mounted in the control module 52 as individual cartridges and are held in place by suitable connectors such as the illustrated nuts 154 and 156. The pump plunger 100 and override valve plunger 108 extend upwardly from the upper surface 152 of the module housing 140 for manual access. The solenoid 78 of the control valve 48 extends outwardly from the side surface module 144 of the housing 140. The control module 52 is connected to the main supply conduit 60, the brake release actuator supply conduit 38, and the drain conduit 76 by first, second, and third ports 158, 160, and 162, respectively, all of which are formed in a common side 150 of the module housing 140 to maximize compactness. The remaining conduits of the braking system 30, illustrated within the borders of the phantom-lined control module 52 in FIG. 2, are internal to the control module 52.

In operation, whenever the vehicle engine 66 and charge pump 46 are operational and a brake-release switch is closed, the power source 80 transmits an energizing signal to the solenoid actuator 78 to switch the control valve 48 from the position illustrated in FIG. 2 to its actuated position to permit the flow of pressurized hydraulic fluid to the brake release actuators 44 through the brake release actuator supply conduit 38 to release the brakes 40. Fluid flows freely through the override valve 84 at this time because the override valve 84 is maintained in its open position by the supply of pressurized fluid to the inlet/pilot port 104. Fluid short circuiting through the hand pump 86 and to the reservoir 64 is prevented by the first and second check valves 88 and 90.

If the operator turns off the engine 66 to park the vehicle 10 (with resultant brake release switch opening and deenergization of solenoid actuator 78), or if the engine 66, charge pump 46, control valve 48, or one of the hydraulic fluid conduits 60, etc. fails, pressurized fluid will drain from the brake release actuators 44 through the valves 84 and 48 to permit brake engagement under the force of the springs 42. The brakes 40 usually will remain engaged until the engine 66 is restarted. If, however, the operator wishes to release the brakes 40 for towing or assisted transport, he or she will depress the plunger 108 to close the override valve 84 and thereby to isolate the brake release actuators 44 and the pump outlet from the reservoir 64. The operator can then manually reciprocate the pump plunger 100 to generate sufficient hydraulic fluid in the brake release actuators 44 to release the brakes 40. About ten strokes of the pump plunger 100 usually will suffice. The vehicle 10 can now be towed or otherwise moved without interference from the brakes 40. The brakes 40 may remain released until the engine 66 is restarted and the charge pump once again generates hydraulic fluid pressure. At this time, the control valve 48 is actuated under control of the power source 80 to permit pressurized hydraulic fluid to flow into the brake actuator supply conduit 38 and into the inlet/pilot port 104 of the override valve 84. Hydraulic pressure in the pilot chamber 130 causes the pilot actuator 110 to reset the override valve 84 to its open position, thereby permitting two-way fluid flow between the control valve 48 and the brake release actuators 44. When the engine 66 is subsequently turned off or other actions are taken to return the control valve 48 to the position illustrated in FIG. 2 to engage the brakes 40, fluid is free to flow from the brake release actuators 44, through the override valve 84, through the control valve 48, and into the reservoir 64, thereby permitting brake engagement under force of the springs 42. Of course, if the operator desires to reset the brakes 40 without restarting the engine 66, he or she need only manually move the plunger 108 back to its original position illustrated in FIG. 3 to manually reset the valve 84 and to permit fluid flow from the brakes 40, through the valve 84, through the valve 48 (assuming the valve 48 is in its illustrated position), and to the reservoir 64.

The automatically resettable override valve 84 represents a marked improvement over manually reset override valves which remain in their closed position unless and until the operator remembers to release the valve. In systems employing such manually reset valves, braking action could remain unavailable even after the vehicle's engine is turned off or fails because fluid would be trapped between the closed override valve and the brake release actuator.

Many changes and modifications could be made to the invention without departing from the spirit thereof. The scope of some of these changes is discussed above. The scope of other changes will become apparent from the appended claims.

I claim:

1. A spring applied, hydraulically released parking and emergency braking system comprising:
   (A) a brake assembly including
      (1) a brake which is movable between an applied position and a released position,
      (2) a spring which biases said brake towards said applied position, and
      (3) a brake release actuator which is selectively operable to release said brake against an application force imposed by said spring; and
   (B) a hydraulic release subsystem including
      (1) a source of pressurized hydraulic fluid,
      (2) a reservoir,
      (3) a control device which is switchable from a first configuration coupling said brake release actuator to said source of pressurized hydraulic fluid to a second configuration coupling said brake release actuator to said reservoir, and
      (4) a manual override assembly including
         (a) a pump which has an outlet in fluid communication with said brake release actuator, and
         (b) a manually actuated, automatically resettable override valve which is manually closable to isolate said brake release actuator and said outlet of said pump from said reservoir and which opens automatically in response to the presence of hydraulic pressure at a designated location in said braking system to permit fluid flow therethrough.

2. A braking system as defined in claim 1, wherein said override valve comprises a two-way/two-position valve which includes
   a manual actuator which, when moved to a valve-closing position, closes said override valve, and
   a pilot actuator which is in fluid communication with said designated location of said braking system and which automatically opens said override valve in response to the presence of hydraulic pressure at said designated location of said braking system.

3. A spring applied, hydraulically released parking and emergency braking system comprising:
   (A) abrake assembly including
      (1) a brake which is movable between an applied position and a released position,
      (2) a spring which biases said brake towards said applied position, and
      (3) a brake release actuator which is selectively operable to release said brake against an application force imposed by said spring; and
   (B) a hydraulic release subsystem including
      (1) a source of pressurized hydraulic fluid,
      (2) a reservoir,
      (3) a control device which is switchable from a first configuration coupling said brake release actuator to said source of pressurized hydraulic fluid to a second configuration coupling said brake release actuator to said reservoir, and
      (4) a manual override assembly including
         (a) a pump which has an outlet in fluid communication with said brake release actuator, and
         (b) a manually actuated, automatically resettable override valve which is manually closable to isolate said brake release actuator and said outlet of said pump from said reservoir and which opens automatically in response to the presence of hydraulic pressure at a designated location in said braking system to permit fluid flow therethrough, wherein said override valve comprises a two-way/two-position valve which includes
            a manual actuator which, when moved to a valve-closing position, closes said override valve, and
            a pilot actuator which is in fluid communication with said designated location of said braking system and which automatically opens said override valve in response to the presence of hydraulic pressure at said designated location of said braking system, wherein said override valve is located in a hydraulic conduit connecting said control device to said brake release actuator, and wherein said override valve comprises
               a housing in which is formed 1) an axial bore, 2) a first port in fluid communication with said control device, and 3) a second port in fluid communication with said brake release actuator, and
               a spool which is movable in said axial bore from a first position permitting fluid flow between said first port and said second port and a second position prohibiting fluid flow between said first port and said second port.

4. A braking system as defined in claim 3, wherein
   said pilot actuator is coupled to a first axial end of said spool,
   said manual actuator is coupled to a second axial end of said spool and extends beyond an outer wall of said housing, and
   an inlet/pilot port is formed in said housing in fluid communication with said pilot actuator.

5. A spring applied, hydraulically released parking and emergency braking system comprising:
   (A) a brake assembly including
      (1) a brake which is movable between an applied position and a released position,
      (2) a spring which biases said brake towards said applied position, and
      (3) a brake release actuator which is selectively operable to release said brake against an application force imposed by said spring; and
   (B) a hydraulic release subsystem including
      (1) a source of pressurized hydraulic fluid,
      (2) a reservoir,
      (3) a control device which is switchable from a first configuration coupling said brake release actuator to said source of pressurized hydraulic fluid to a second configuration coupling said brake release actuator to said reservoir, and
      (4) a manual override assembly including
         (a) a pump which has an outlet in fluid communication with said brake release actuator, and
         (b) a manually actuated, automatically resettable override valve which is manually closable to isolate said brake release actuator and said outlet of said pump from said reservoir and which opens automatically in response to the presence of hydraulic pressure at a designated location in said braking system to permit fluid flow therethrough, wherein
   said override valve comprises a two-way/two-position valve which includes a manual actuator which, when moved to a valve-closing position, closes said override valve, and
a pilot actuator which is in fluid communication with said designated location of said braking system and which automatically opens said override valve in response to the presence of hydraulic pressure at said designated location of said braking system, wherein said pilot actuator is in fluid communication with a hydraulic fluid conduit connecting said control device to said override valve.

6. A braking system as defined in claim 1, wherein said override valve is located in a hydraulic fluid conduit connecting said control device to said brake release actuator.

7. A spring applied, hydraulically released parking and emergency braking system comprising:
(A) a brake assembly including
    (1) a brake which is movable between an applied position and a released position,
    (2) a spring which biases said brake towards said applied position, and
    (3) a brake release actuator which is selectively operable to release said brake against an application force imposed by said spring; and
(B) a hydraulic release subsystem including
    (1) a source of pressurized hydraulic fluid,
    (2) a reservoir,
    (3) a control device which is switchable from a first configuration coupling said brake release actuator to said source of pressurized hydraulic fluid to a second configuration coupling said brake release actuator to said reservoir, and
    (4) a manual override assembly including
        (a) a pump which has an outlet in fluid communication with said brake release actuator, and
        (b) a manually actuated, automatically resettable override valve which is manually closable to isolate said brake release actuator and said outlet of said pump from said reservoir and which opens automatically in response to the presence of hydraulic pressure at a designated location in said braking system to permit fluid flow therethrough, wherein
            said control device comprises a three-way/two-position solenoid actuated valve having a solenoid actuator, a first port in fluid communication with said source of pressurized hydraulic fluid, a second port in fluid communication with said override valve, and a third port in fluid communication with said reservoir, and wherein energization of said solenoid actuator isolates said second port from said third port and connects said second port to said first port.

8. A braking system as defined in claim 7, wherein said solenoid actuator is energized whenever a brake release switch is closed.

9. A spring applied, hydraulically released parking and emergency braking system comprising:
(A) a brake assembly including
    (1) a brake which is movable between an applied position and a released position,
    (2) a spring which biases said brake towards said applied position, and
    (3) a brake release actuator which is selectively operable to release said brake against an application force imposed by said spring; and
(B) a hydraulic release subsystem including
    (1) a source of pressurized hydraulic fluid,
    (2) a reservoir,
    (3) a control device which is switchable from a first configuration coupling said brake release actuator to said source of pressurized hydraulic fluid to a second configuration coupling said brake release actuator to said reservoir, and
    (4) a manual override assembly including
        (a) a pump which has an outlet in fluid communication with said brake release actuator, and
        (b) a manually actuated, automatically resettable override valve which is manually closable to isolate said brake release actuator and said outlet of said pump from said reservoir and which opens automatically in response to the presence of hydraulic pressure at a designated location in said braking system to permit fluid flow therethrough, wherein
            said manual override assembly and said control device are integrated as a single brake control module having a first port in fluid communication with said source of pressurized hydraulic fluid, a second port in fluid communication with said brake release actuator, and a third port in fluid communication with said reservoir.

10. A braking system as defined in claim 1, wherein said pump comprises a manually actuated pump including
    a chamber which has an inlet in fluid communication with said reservoir and an outlet in fluid communication with said brake release actuator,
    a manually-actuated plunger which is reciprocatable with respect to said chamber from an extended, primed position to an inserted, pressure-generating position, and
    a return spring which biases said plunger towards said extended position.

11. A braking system as defined in claim 1, wherein said override valve is also manually resettable.

12. A spring applied, hydraulically released braking system comprising:
(A) a brake assembly including
    (1) a brake which is movable between an applied position and a released position,
    (2) a spring which biases said brake towards said applied position; and
    (3) a brake release actuator which is selectively operable to impose a release force on said brake that opposes an application force imposed by said spring; and
(B) a brake release subsystem including
    (1) an unpressurized reservoir,
    (2) a powered charge pump which has an inlet connected to said reservoir and which has an outlet; and
    (3) a brake control module including
        (a) a module housing which has a first port coupled to said outlet of said charge pump by a main supply conduit, a second port coupled to said brake release actuator by a brake release actuator supply conduit, and a third port coupled to said reservoir by a drain conduit,
        (b) a three-way/two-position solenoid actuated control valve which is disposed at least partially within said module housing and which has a solenoid actuator and first, second, and third ports coupled to first, second, and third internal conduits of said module housing, respectively, said first, second, and third ports being coupled to said main supply conduit, said brake release actuator supply conduit, and said drain conduit, respectively, wherein energization of said solenoid actuator isolates said second port of said control valve from said third port of said control valve and connects said second port of said control valve to said first port of said control valve, and wherein said solenoid actuator is energized whenever said engine is operating, (c) a manually-actuated override pump which is mounted in said module housing and which has an outlet in fluid communication with said second internal conduit, an inlet in fluid communication with said third internal conduit, and a manually-actuated plunger extending beyond an outer wall of said module housing, and (d) a two-way/two-position manually actuated, automatically resettable override valve which is mounted in said module housing, which is located in said second internal conduit between said control valve and said second port of said module housing, and which includes
  (i) an axial bore,
  (ii) an inlet/pilot port which is in fluid communication with said second port of said control valve,
  (iii) an outlet port which is in fluid communication with said second port of said module housing and with said brake release actuator supply conduit,
  (iv) a spool which is movable axially in said axial bore from a first position permitting fluid flow between said inlet/pilot port and said outlet port and a second position prohibiting fluid flow between said inlet/pilot port and said outlet port,
  (v) a manual actuator which is coupled to a first axial end of said spool and which extends beyond an outer wall of said module housing, and
  (vi) a pilot actuator which is coupled to a second axial end of said spool and which is in fluid communication with said inlet/pilot port.

13. An industrial vehicle comprising:
(A) front and rear rotatable supports which rest on the ground;
(B) a chassis which is supported on said rotatable supports;
(C) an operator's seat which is mounted on said chassis;
(D) an engine which drives at least one of said rotatable supports to rotate to thereby propel said vehicle to move along the ground; and
(E) a spring applied, hydraulically released braking system which is coupled to at least one of said rotatable supports, said braking system including
  (1) a brake assembly including
    (a) a brake which is movable between an applied position and a released position,
    (b) a spring which biases said brake towards said applied position, and
    (c) a brake release actuator which is selectively pressurizable to release said brake against an application force imposed by said spring, and
  (2) a hydraulic release subsystem including
    (a) a source of pressurized hydraulic fluid,
    (b) a reservoir,
    (c) a control device which is switchable from a first configuration coupling said brake release actuator to said source of pressurized hydraulic fluid to a second configuration coupling said brake release actuator to said reservoir, and
    (d) a manual override assembly which includes
      (i) a pump which has an outlet in fluid communication with said brake release actuator, and
      (ii) a manually actuated, automatically resettable override valve which is manually closable to isolate said brake release actuator from said reservoir and said outlet of said pump and which opens automatically in response to the presence of hydraulic pressure at a designated location in said braking system to permit fluid flow therethrough.

14. An industrial vehicle as defined in claim 13, wherein said override valve comprises a two-way/two-position valve which includes
  a manual actuator which, when moved to a valve closing position, closes said override valve, and
  a pilot actuator which is in fluid communication with said designated location of said braking system and which automatically opens said override valve in response to the presence of hydraulic pressure at said designated location of said braking system.

15. An industrial vehicle as defined in claim 13, wherein said vehicle comprises a ride-on roller and said rotatable supports comprise metal drums.

16. A method comprising:
(A) applying a brake by bleeding pressurized hydraulic fluid from a brake release actuator to permit a spring to actuate said brake release actuator; then
(B) manually releasing said brake by
  (1) manually actuating an override valve to isolate an outlet of a pump and said brake release actuator from a reservoir, and
  (2) manually actuating said pump to supply pressurized hydraulic fluid to said brake release actuator to thereby release said brake against an application force imposed by said spring; and then
(C) selectively automatically resetting said override valve upon generation of hydraulic pressure by said braking system to thereby permit subsequent return fluid flow through said override valve from said brake release actuator.

17. A method as defined in claim 16, wherein said override valve comprises a two-way/two-position spool valve, and wherein the actuating step comprises manually depressing a plunger to drive an internal spool of said spool valve to a valve-closing position.

18. A method comprising:
(A) applying a brake by bleeding pressurized hydraulic fluid from a brake release actuator to permit a spring to actuate said brake release actuator; then
(B) manually releasing said brake by
  (1) manually actuating an override valve to isolate an outlet of a pump and said brake release actuator from a reservoir, and
  (2) manually actuating said pump to supply pressurized hydraulic fluid to said brake release actuator to thereby release said brake against an application force imposed by said spring; and then
(C) selectively automatically resetting said override valve upon generation of hydraulic pressure by said braking system to thereby permit subsequent return fluid flow through said override valve from said brake release actuator, wherein said override valve comprises a two-way/two-position spool valve, and wherein the resetting step comprises supplying pressurized hydraulic fluid to an inlet/pilot port of said override valve to automatically drive an internal spool of said spool valve to a valve-opening position.

19. A method as defined in claim 16, wherein the resetting step comprises supplying pressurized hydraulic fluid to an inlet/pilot port of said override valve.

20. A method comprising:
(A) applying a brake by bleeding pressurized hydraulic fluid from a brake release actuator to permit a spring to actuate said brake release actuator; then
(B) manually releasing said brake by
   (1) manually actuating an override valve to isolate an outlet of a pump and said brake release actuator from a reservoir, and
   (2) manually actuating said pump to supply pressurized hydraulic fluid to said brake release actuator to thereby release said brake against an application force imposed by said spring; and then
(C) selectively automatically resetting said override valve upon generation of hydraulic pressure by said braking system to thereby permit subsequent return fluid flow through said override valve from said brake release actuator, wherein
   the resetting step comprises supplying pressurized hydraulic fluid to an inlet/pilot port of said override valve, wherein
   a pilot conduit connects said pilot port to a conduit connecting said override valve to a control valve, and wherein
   the resetting step comprises switching said control valve from a first position in which said conduit is isolated from a source of pressurized hydraulic fluid to an open position in which said branch conduit is connected to said source of pressurized hydraulic fluid.

21. A method as defined in claim 20, wherein the switching step is performed automatically whenever said source of pressurized hydraulic fluid is operating.

22. A method comprising:
(A) applying a brake by bleeding pressurized hydraulic fluid from a brake release actuator to permit a spring to actuate said brake release actuator; then
(B) manually releasing said brake by
   (1) manually actuating an override valve to isolate an outlet of a pump and said brake release actuator from a reservoir, and
   (2) manually actuating said pump to supply pressurized hydraulic fluid to said brake release actuator to thereby release said brake against an application force imposed by said spring; and then
(C) selectively automatically resetting said override valve upon generation of hydraulic pressure by said braking system to thereby permit subsequent return fluid flow through said override valve from said brake release actuator, wherein
   the resetting step comprises supplying pressurized hydraulic fluid to an inlet/pilot port of said override valve, wherein
   said control valve comprises a three-way/two-position solenoid valve,
   said conduit is coupled to said reservoir when said control valve is in said open position, and
   said conduit is isolated from said reservoir when said control valve is in said closed position.

23. A method as defined in claim 22, further comprising reapplying said brake following the resetting step by returning said control valve to said first position thereof.

24. A method as defined in claim 16, further comprising selectively manually resetting said override valve by manually returning said override valve to an open position thereof.

25. A spring applied, hydraulically released parking and emergency braking system comprising:
(A) a brake assembly including
   (1) a brake which is movable between an applied position and a released position,
   (2) a spring which biases said brake towards said applied position, and
   (3) a brake release actuator which is selectively operable to release said brake against an application force imposed by said spring; and
(B) a hydraulic release subsystem including
   (1) a source of pressurized hydraulic fluid,
   (2) a reservoir,
   (3) a control device which is switchable from a first configuration coupling said brake release actuator to said source of pressurized hydraulic fluid to a second configuration coupling said brake release actuator to said reservoir, and
   (4) a manual override assembly including
      (a) a pump which has an outlet in fluid communication with said brake release actuator, and
      (b) a manually actuated, automatically resettable override valve which is manually closable to isolate said brake release actuator and said outlet of said pump from said reservoir and which opens automatically in response to the presence of hydraulic pressure in a hydraulic fluid conduit connecting said control device to said override valve to permit fluid flow therethrough.

\* \* \* \* \*